United States Patent Office
3,674,526
Patented July 4, 1972

3,674,526
MOLDABLE METAL POWDER COMPOSITIONS
James M. Self, Wilmington, Del., assignor to E. I. du Pont de Nemours and Company, Wilmington, Del.
No Drawing. Continuation-in-part of application Ser. No. 739,627, June 25, 1968. This application Mar. 10, 1970, Ser. No. 18,345
Int. Cl. C08h 17/24
U.S. Cl. 106—286                                9 Claims

ABSTRACT OF THE DISCLOSURE

This invention is generally directed toward compositions of metal powder aggregate or mixtures of a metal powder aggregate and a refractory, and a siliceous binder which when formed and cured are useful as strong, heat conductive shapes, e.g. tooling compounds; and cured articles of the above composition.

CROSS-REFERENCE TO RELATED APPLICATION

This application is a continuation-in-part of my co-pending application Ser. No. 739,627, filed June 25, 1968, now abandoned.

BACKGROUND OF THE INVENTION

This invention is directed toward compositions of metal powder aggregate, or mixtures of a major proportion of a metal powder aggregate a minor proportion of a refractory, and siliceous binders which when combined are useful as thermally conductive molding materials; and cured articles of the above composition, e.g. production tools, molding chills and industrial filters.

A production tool is an article used by industry for the mass reproduction of relatively large and/or structurally intricate objects. The tool itself can be most simply described as a mold-like structure in the mirror image of the article to be formed.

The composition of the tool will ordinarily vary depending upon the shape of the object to be formed, the type of the material from which the object is to be fashioned, and the means employed in shaping the material to correspond to the contours of the tool.

Production tools have traditionally been made from sand casting of mild steel, however, metal tools of this type are expensive and difficult to fashion.

Because of the difficulty and expense encountered in making such metal tools, there is an industrial demand for materials which are less expensive and easier to fabricate.

Epoxy resins and ceramics have been used as substitutes for the more expensive metals because of the greater ease of fabrication of these materials. However, both these classes of materials form substantially weaker tooling compounds than those formed by the more traditional metal casting techniques.

Furthermore, neither of these substitutes possess the requisite degree of thermal conductance for the forming of materials which are sensitive to uneven temperature distribution; the organic resins being more conductive than the ceramics, however, tending to decompose at temperatures in excess of 500° F. Attempts to compensate for this inherent lack of thermal conductance of ceramics, by strategically embedding heating units in critical parts of the tool, have not met with very wide industrial acceptance.

My metal powder aggregate or mixture of a major proportion of a metal powder aggregate and minor proportion of a refractory, and silica compositions provide a material which can be readily formed into very strong, thermally conductive shapes, e.g. tooling compounds, molding chills and industrial filters, by inexpensive ceramic casting techniques, while having the requisite degree of heat stability and thermal conductance to maintain uniform temperature distribution throughout the formed material.

SUMMARY

In summary, my invention is directed toward moldable metallic compositions consisting essentially of 82 to 98 parts metal powder aggregate of iron, copper, aluminum, their alloys, or mixtures thereof, or a mixture of a major proportion of a metal powder aggregate and a minor proportion of a refractory, and 2 to 18 parts inorganic colloidal silica aquasol selected from an alkali stabilized colloidal silica sol having a particles size of from 4 to 100 millimicrons, a pH of from 8.0 to 10.5 and from 10 to 60% $SiO_2$ solids by weight; a lithium stabilized colloidal silica sol having an average particle size of from 1 to 150 millimicrons, a pH of 10.5 to 12.0, an $SiO_2:Li_2O$ mole ratio of from 4:1 to 25:1, and from 1 to 25% solids by weight; or a positively charged metal oxide coated colloidal silica sol having a particle size of 4 to 15 millimicrons, a pH of from 3.0 to 6.0 and from 10 to 50% solids by weight, of which 2 to 25% are basic metallic salts.

This invention is also directed toward cured articles of the above metallic composition.

DETAILED DESCRIPTION OF INVENTION

This invention is specifically directed toward compositions of metal powder aggregate, or mixtures of a metal powder aggregate and a refractory, and an aqueous siliceous binder; and cured articles of the above composition.

The moldable metallic compositions of this invention comprise 82 to 98 parts metallic powder aggregate, having a particle size of less than 250 microns, and 2 to 18 parts aqueous siliceous binder. The aggregate material of the composition can comprise a mixture of metal powder aggregate and a refractory, said refractory being present in a concentration of less than 50% of the weight of the total aggregate material and also having a particle size of less than 250 microns.

Composition components (a) Aggregate materials.—The uncured composition of this invention can contain 82 to 98 parts by weight of an aggregate material in each 100 parts uncured composition.

The aggregate materials of this composition are selected from among the metal powders of iron, copper, aluminum, their respective alloys or mixtures thereof.

An "alloy" of these metals comprises an intimate admixture of two or more metals containing at least 50% by weight of one of the three metals specifically mentioned above. For example, among the alloys which can be used in the compositions of this invention are the stainless steels, the bronzes, and the brasses.

The particle size of the respective metal powder aggregate of this invention cannot exceed 250 microns without adversely affecting the strength and the surface finish of the cured composition. Very fine metal powder aggregates, common known as "flours," can also be used in these compositions and are especially useful where very smooth cured composition surfaces are desired.

The metal powder aggregates which are preferred for the compositions and articles of this invention are iron, aluminum, and the stainless steels.

The aggregate materials of this composition can also comprise a mixture of one or more of the metal powder aggregates described above and a refractory material having a particle size of less than 250 microns. Refractory materials may be usually added to the aggregate mass as a substitute for the more expensive metal powders. The concentration of refractory in the aggregate mass cannot equal or exceed the amount of metal powder in the aggregate without adversely effecting the metallic qualities of the composition.

The following is only a partial list of some of the fibrous and particulate refractories which can be used in the agregate component of this composition:

(1) Fibrous refractories, such as, mineral wool (Baldwin-Ehret-Hill, Inc.); aluminosilicate ceramic fibers (Carborundum Co.); asbestos (Johns-Mansville); paper pulp; and glass wool (Owens-Corning Fiberglass Corp.); and (2) Particulate refractories, such as, perlite (Coralux Perlite Corp. of New Jersey, Inc.); amorphous silica (Harbison-Walker Refractories Co.); vermiculite (W. R. Grace & Co., Zonolite Div.); expanded refractory clay aggregates (Mapleton Development, Inc.); hollow ceramic spheres (Dierks Forests, Inc.); pigmentary potassium titanate (E. I. du Pont de Nemours and Company, Inc.); vitreous of fused silica; zirconia; refractory alumina; mullite; molokite; and Calamo (Harbison-Walker Refractories Co.).

(b) Aqueous siliceous binders.—The uncured compositions of this invention can contain 2 to 18 parts by weight of an inorganic colloidal silica sol in each 100 parts uncured composition.

The inorganic colloidal silica sols of this composition are selected from among the alkali stabilized colloidal silica sols; the lithium stabilized colloida silica sols; or the positively charged metal oxide coated colloida silica sols.

The alkali stabilized colloidal silica sols which can be used in the compositions of this invention have a particle size of from 4 to 100 millimicrons, a pH of from 8.0 to 10.5 and from 10 to 60% solids by weight. The preparation and characteristics of these sols are more precisely described in Bechtold and Snyder, U.S. Pat. 2,574,902; Rule, U.S. Pat. 2,577,485; and Alexander, U.S. Pat. 2,750,345.

A second class of colloidal silica sol of the compositions of this invention are the lithium stabilized sols which have an $SiO_2:Li_2O$ mole ratio of from 4:1 to 25:1, an average particle diameter ranging from 1 to 150 millimicrons, a pH of from 10.5 to 12.0 and from 1 to 25% solids by weight. The preparation and characteristics of these sols are more precisely described in Iler, U.S. Pat. 2,688,149.

A third class of colloidal silica sol of the compositions of this invention are the positively charged metal oxide coated sols which have a particle size of from 4 to 15 millimicrons, a pH of from 3.0 to 6.0 and from 10 to 50% solids by weight of which 2 to 25% are basic metallic salts. The preparation and characteristics of these sols are more precisely described in Alexander and Bolt, U.S. Pat. 3,007,878; Mundick and Reven, U.S. Pat. 3,139,406; and Mindick and Thompson, U.S. Pat. 3,252,917.

The preferred metal oxide coated silica sols which are also the preferred binders of this invention are the alumina coated sols, prepared by the method described in the copending application, Moore, U.S. Ser. No. 831,748, filed June 9, 1969.

Both the alkali stabilized colloidal sols and the lithium stabilized sols are stable on the basic side, and when combined with some of the aggregate materials of this invention will react in such a manner as to cause gelation of foaming of the uncured composition. This type of reaction is also experienced when the positively charged sols, stable on the acid side, are combined with metals above hydrogen in the electromotive series of elements.

For example, iron powder aggregates do not react when combined with the alkali stabilized colloidal sols or the lithium stabilized colloidal because of their basic pH, however, when iron aggregate is to be added to an acidic binder, a stabilizer compound must be added to the acidic binder prior to the addition of the aggregate to prevent destabilization.

A stabilizer compound should be present in all compositions of this invention in which positively charged metal oxide coated silica sols are used as binders.

Aluminum aggregate, being amphoteric, reacts with both the basic and acidic binders, and consequently a stabilizer compound must be added to both types of binder in advance of the addition of an aluminum aggregate to prevent destabilization in all compositions of this invention.

Alloy aggregates generally follow the same general pattern as their predominant metal, with certain exceptions. Stainless steels are exceptional alloys, and do not destabilize compositions having either an acidic or basic binder.

Where the destabilized composition gels upon, or shortly after, admixture, the composition cannot be satisfactorily cast or molded into the desired shapes. Foaming of the slip presents a similar problem, in that the pot life and the strength of the final composition is reduced.

In order to avoid the problems encountered by the interaction of some of the metal aggregates, especially amphoteric materials like aluminum, with the various siliceous binders, a minor amount, ordinarily from 0.1 to 3.0% by weight based upon the weight of binder, of a slip stabilizer, such as potassium dichromate, is added to the binder prior to its admixture with metal aggregate.

Article formation

Cured articles of the composition of this invention can be formed by homogeneously mixing the various components of this invention in their proper porportions, casting or forming the viscous composition into a mold or shape, and curing the green casting or shape by heating, preferably to a temperature immediately below the melting point of the metallic aggregate.

As noted earlier in the specification, the caustic or acidic binder may react with some of the metal aggregates causing destabilization of the uncured composition. In order to prevent instability, it is incumbent to add a stabilizer compound to the siliceous binder prior to the addition of an incompatible metal aggregate. Binders which are combined with aluminum powder aggregate must have a stabilizer present in all such compositions of this invention.

There are a variety of compounds and methods which can be used to prevent the interaction between the binder and the metal aggregate. A number of inorganic and organic materials can be added to the siliceous binders prior to the addition of the metal aggregate.

The inorganic stabilizer compounds which are preferred for the compositions are those containing chromate, nitrite, phosphate, permanganate, $Mg^{++}$, $Ca^{++}$, $Ni^{++}$, $SO_3^{--}$, $WO_4^{--}$, or $TiO^{--}$.

Potassium dichromate being most preferred for aluminum aggregate compositions, in a concentration of about 1.0% by weight based on the weight of the binder.

Certain organic materials can also be added to the binder prior to the addition of an incompatible metal aggregate, however, these stabilizers will ordinarily decompose upon curing of the green casting thereby generally substantially impairing the strength of the cured article.

Instead of adding a stabilizer to the binder, an incompatible metal aggregate can be rendered inert by coating it with a material which insulates it from the caustic or acidic siliceous material. The methods of coating metal powders are especially well adapted for the aluminum powders. The Reynolds Metals Company publication, "Finishes for Aluminum" vol. I and II (1963), summarizes the various techniques and compounds available for coating various forms of aluminum. Chromate conversion coatings appear to be the preferred technique for coating aluminum powders, to thereby insulate them from reaction with the binders.

Where metal powder aggregates are coated with an insulating material to prevent destabilization, the total particle size, aggregate plus coating, cannot exceed 250 microns for the same previously stated reasons.

After homogeneously combining the composition components in a stable viscous mass, it can be cast or formed into a mold or shape, depending upon its consistency. The compositions consistency will vary depending upon the amount of binder present.

As stated earlier, this composition permits the use of ceramic casting techniques in the forming of metal articles, and therefore the composition should have a viscosity consistent with this method of casting.

The homogeneous composition of this invention can be cast over a mat of reinforcing filler materials or alternatively cast-set in layers, with or without reinforcing filler materials, to form a laminate. A laminate will comprise at least two layers of uncured composition and possibly a single layer of reinforcing filler materials sandwiched in between the composition layers; each being independently cast and set, and then integrally bonded to one another during the curing step of formation process.

The reinforcing fillers of the laminated articles of this invention will be in the form of strands, rovings, mats or woven materials of aluminum, copper, fiberglass, alumino silicate ceramic fibers, asbestos, or heavy metal oxides of zirconium, titanium or hafnium.

Ordinarily, the individual layers will each be of approximately the same thickness and rarely exceed an independent depth of ¼ inch. The number of layers in a laminate can vary, and the total thickness of the laminate is only limited by the same practical and technical limitations placed on formation of non-laminated articles.

Following casting or forming of the composition, it is allowed to set at ambient temperatures for approximately 18 to 24 hours or longer depending upon its thickness, or until sufficient internal moisture evaporates so that the green article will not deform upon heating.

After sufficient moisture has evaporated, the green casting is placed in an oven and heated at a rate of 500° F. per hour until the desired curing temperature is reached. The optimum curing temperature appears to be at a temperature immediately below the melting point of the metal aggregate component of the composition.

The time required to cure the composition will depend primarily upon the shape and thickness of green mass, the amount of binder present and the amount of metal aggregate present in the composition, although these are not the only factors which can effect duration of curing.

After the article is cured, it is cooled and removed from its mold (if any). The cured article is then ready for use and can be machined, drilled, or worked with hand tools.

Cured articles of the compositions of this invention can be formed into filters, air bearings, metal casting flasks and other objects where adaptation of ceramic casting or shells, decorative shapes, heat exchangers, brake shoes techniques to the formation of strong metal shapes would be both economic and feasible.

Occasionally, the surface of the cured article may dry powdery and/or irregularly. A thin coating of binder and stabilizer, if present in original composition, applied to the powdery, irregular surface of the cured article and cured will glaze the surface with a thin film of ceramic thereby enhancing its appearance and surface hardness.

The examples which follow are intended only as illustrative of some of the specific embodiments of this invention and are by no means exclusive of other disclosed embodiments.

Parts and percentages specified in the examples are by weight unless otherwise stipulated.

EXAMPLE 1

The atomized aluminum powder of this example has the following properties:

Average mesh size: Less than 1% on 200 mesh, 93% through 325 mesh
Average particle diameter: 18 microns
Approximate specific gravity: 271
Average apparent density: 1.0 g./cc.

The positively charged binder of this example is a colloidal silica aquasol, having an approximate particle diameter of 15 millimicrons coated with a polymeric basic aluminum salt. The pH is 4–5 and the sol is approximately 30% solids (substantially as described in U.S. Pat. 3,007,878). A stabilizer of 1.68 grams of potassium dichromate (Baker-analyzed reagent) per 1000 grams sol is added to stabilize the aluminum in an acid system.

A slurry of 30 grams of the atomized aluminum powder described above (Alcoa 123) is mixed with 13 grams positive sol binder to form a slip. The material is then poured into molds 1 x 4 x ¼ inches. Bars made in this manner are dried for 18–24 hours at room temperature. Samples are then cured at 500° F. and 1000° F. for 30 minutes. The modulus of rupture and shrinkage data for the samples are given below:

| Curing temp., ° F. | M of R, lb./in.$^2$ | Shrinkage, percent |
| --- | --- | --- |
| 72 | 153 | <.5 |
| 500 | 249 | <.5 |
| 1,000 | 467 | <.5 |

EXAMPLE 2

The procedure of Example 1 is repeated. The samples are dried, cured, and tested in a similar fashion to those in Example 1. This data is given below. The atomized aluminum powder has the following properties.

Average mesh size: 100% through 325 mesh
Average particle diameter: 5.70 microns
Apparent density: .55

Thirty grams of the atomized aluminum powder described in Example 1 (Valimet 818) are mixed with 12.9 grams of the positive sol binder containing a proportional amount of stabilizer (also described in Example 1). The final shape has a very smooth surface.

| Curing temp., ° F. | M of R, lb./in.$^2$ | Shrinkage, percent |
| --- | --- | --- |
| 72 | 485 | <.5 |
| 500 | 552 | <.5 |
| 1,000 | 892 | <.5 |

EXAMPLE 3

The procedure of Example 1 is repeated. The samples are dried, cured and tested in a similar fashion to those in Example 1. The data is given below. Forty-five grams of the atomized aluminum powder (described in Example 2) are blended with 45 grams of −100 +150 mesh cut atomized aluminum powder. 20.4 grams of positive sol binder containing a proportional amount of stabilizer as described in Example 1 is mixed with the blend of atomized aluminum powder. The results are given below.

| Curing temp., ° F. | M of R, lb./in.$^2$ | Shrinkage, percent |
| --- | --- | --- |
| 72 | 617 | <.5 |
| 500 | 1,168 | <.5 |
| 1,000 | 1,637 | <.5 |

EXAMPLE 4

(A) Thirty grams of atomized aluminum powder (described in Example 1, Alcoa 123) are mixed with 13 grams positive sol binder containing the stabilizer as described in Example 1. Test bars are prepared and dried for 18–24 hours at room temperature. Samples are then cured at 250, 500, 750, 1000,1100, 1150, and 1200° F.

(B) Samples are made by blending 27 grams of atomized aluminum powder (described in Example 1, Alcoa 123) with 3 grams tabular alumina (99.5+percent $Al_2O_3$, specific gravity 3.65–3.8; T–61 Alcoa). This blend is then formulated with 13.0 grams positive sol binder containing the stabilizer as described in Example 1. The samples were prepared, dried, cured like the samples described above (Example 4–A).

(C) Samples are made by blending 24 grams of atomized aluminum powder (described in Example 1, Alcoa 123) with 6 grams tabular alumina. The blend is then formulated with 13.0 grams positive sol binder containing the stabilizer as described in Example 1. The samples are prepared, dried and cured like the samples described above (Example 4–A).

The results of the modulus of rupture testing are given below.

|  | Formulation, lb./in.² | | |
|---|---|---|---|
|  | A | B | C |
| Curing temp., °F.: |  |  |  |
| 72 | 172 | 212 | 240 |
| 250 | 181 | 225 | 255 |
| 500 | 245 | 279 | 325 |
| 750 | 350 | 375 | 405 |
| 1,000 | 440 | 460 | 510 |
| 1,100 | 415 | 530 | 570 |
| 1,150 | 500 | 550 | 590 |
| 1,200 | 510 | 560 | 620 |

EXAMPLE 5

Aluminum fly screen is cut to a dimension $1/16$ of an inch by length and width smaller than the 1 x 4 x ¼-inch mold. Formulations of various atomized aluminum powders and positive sol binders are mixed into pourable slips. Samples are prepared by pouring a layer of slip, inserting a piece of aluminum fly screen and so on until the full thickness of the sample is achieved. The formulation, ply and modulus of rupture data are given below.

Formulation:     M of R (A)

Thirty grams of atomized aluminum powder (described in Example 2, Valimet 818); 13.2 grams positive sol binder containing the stabilizer as described in Example 1; 6 pieces aluminum fly screen and then cured for one hour at 1150° F. _____ 2450 lb./in.²

(B)

30 grams of the atomized aluminum powder blend described in Example 3; 8.4 grams positive sol binder containing the stabilizer as described in Example 1; 5 pieces aluminum fly screen, and then cured at 1150° F. for one hour _____ 2782 lb./in.²

(C)

Same as Example 5(B), except the aluminum fly screen was treated with positive sol binder containing the stabilizer as described in Example 1 _____ 3168 lb./in.²

EXAMPLE 6

Samples are prepared using various metal powders and inorganic colloids as binders. They are prepared by the method described in Example 1. All samples are cured at 1150° F. for 1 hour. The formulation and modulus of rupture are given below.

Formulation:     M of R (A)

215.6 grams Powdered Iron Metal Electrolytic — Pure, −325 mesh (Fisher Scientific Company) and 54.3 grams of 4.8 ratio lithium stabilized silica sol 21% solids (Lithium Polysilicate 48 Du Pont) ____ 5791 lb./in.²

(B)

82.3 grams Stainless Steel Flake Pigment (−200 mesh, 314 stainless steel, Pfizer) 99.8 grams of 4.8 ratio lithium stabilized silica sol 21% solids (Lithium Polysilicate 58, Du Pont) _____ 2655 lb./in.²

(C)

238.9 grams sponge iron powder
($-80+100 \approx 1\%$;
$-100+150 \approx 18\%$;
$-150+200 \approx 26\%$;
$-200+250 \approx 9\%$;
$-250+325 \approx 24\%$ and
$-325 \approx 2\%\%$ is the particle size distribution), 98.8% iron with an apparent density of 2.45 g./cc. are mixed with 37.5 grams of 4.8 ratio lithium stabilized silica sol (described in Example 6(A)) _____ 1870 lb./in.²

(D)

13 grams sponge iron powder (described in Example 6(C)) are mixed with 57.3 grams positive sol binder containing the stabilizer as described in Example 1 _____ 327 lb./in.²

(E)

120 grams powdered Iron Metal (described in Example 6(A)) are mixed with 62 grams positive sol binder containing the stabilizer as described in Example 1 _____ 637 lb./in.²

(F)

120 grams sponge iron powder (described in Example 6(C)) are mixed with 39 grams alkalai-stabilized colloidal silica, (approx. 15 millimicrons in diameter, 40% SiO₂ solids, "Ludox" HS–40 Du Pont) __ 4874 lb./in.²

(G)

50.9 grams Powdered Iron Metal (described in Example 6(A)) are mixed with 12.0 grams alkali-stabilized colloidal silica (described in Example 6(G)) _____ 3910 lb./in.²

EXAMPLE 7

Fifty grams copper powder (−325 mesh, electrolytic) are blended with 15 grams 4.8 ratio lithium stabilized silica sol (described in Example 6(A). The slip is cast in the shape of a table 1 cm. deep and 10 centimeters in diameter. After drying for 24 hours at room temperature the sample is cured at 1000° F. for 30 mins. During the curing process the sample turned black. This process gives a very high strength body.

EXAMPLE 8

Fifty grams stainless steel powder (−325 mesh 316 stainless steel, Ancor 316 L) are blended with 14 grams 4.8 ratio lithium stabilized silica sol (described in Example 6(A)). The slip is cast in the shape of a tablet 1 cm. deep and 10 centimeters in diameter. After drying for 24 hours at room temperature the sample is cured at 1000° F. for 30 minutes. This process gives a very high strength body.

EXAMPLE 9

Three hundred grams of atomized aluminum powder (described in Example 2, Valimet 818) are mixed with 300 grams of atomized aluminum powder (62% −100 +200; 35% −200 +325; and 3% −325 is the particle size distribution, approx. specific gravity of 2.7, Alcoa 115). One hundred fifty grams positive sol binder containing the stabilizer as described in Example 1 are blended into the powders to form a slip. The slip is poured into a mold 6 x 6 x ½ inches. The sample is allowed to dry for 24 hours at room temperature. It is then cured at 1200° F. for 2 hours. The modulus of rupture and compressive strength data are given below.

M of R: °                             Compressive
3215 lb./in.²  _____  8400 lb./in.²
(average of  _____ (average of
6 samples)  _____ 6 samples)

EXAMPLE 10

Thirty grams of atomized aluminum powder (described in Example 1) are blended with 14.5 grams of alkali-stabilized silica sol ("Ludox" HS–40 described in Example 6(G)) which contains about 1.68 grams of potassium dichromate per 1000 grams of silica sol. This blend is then cast into a shape and cured (as descrbied in Example 1) to give a shape that has good strength.

EXAMPLE 11

Fifty grams of stainless steel flake (described in Example 6(B)) are mixed with 44 grams of alkali-stabilized silica sol ("Ludox" HS–40 described in Example 6(F)). This slip is then cast in a shape and cured (as described in Example 1) to give a shape that has good strength.

EXAMPLE 12

Three hundred grams of atomized aluminum powder (described in Example 2, Valimet 818) are mixed with 300 grams of atomized aluminum powder (described in Example 9, Alcoa 115). One hundred and fifty-six grams positive sol binder containing a stabilizer as described in Example 1 are blended into the powders to form a slip. A portion (approx. ⅓) of the slip is poured into a mold 6 x 6 x ½ inches. On this layer a piece of fiber glass cloth (6 x 6 inches Fiberglas Marquisettegreige goods, Owens-Corning Fiberglas) is placed. The fiber glass cloth was treated with the binding solution prior to placement. This operation was repeated until six pieces of fiber glass cloth were laminated into the shape. The shape was dried for 18 hours at room temperature then cured at 1000° F. for 45 minutes.

Modulus of Rupture—1990 lbs./in.²

EXAMPLE 13

Fifty grams Bearing Bronze powder (82% copper, 16% tin and 2% zinc, −325 mesh) are blended with 14.7 grams 4.8 ratio lithium stabilized silica sol (described in Example 6(A)). The slip is cast in the shape on a tablet one centimeter deep and then centimeters in diameter. After drying for 24 hours at room temperature the sample is cured at 1000° F. for 30 minutes. This process gives a high strength body.

EXAMPLE 14

Fifty grams Bearing Bronze powder (82% copper, 16% tin, and 2% zinc −325 mesh) are blended with 15.1 grams alkali-stabilized colloidal silica (described in Example 6(F)). The slip is cast into the shape of a tablet one centimeter deep and ten centimeters in diameter. After drying for 24 hours at room temperature the sample is cured at 1000° F. for 30 minutes. This process gives a high strength body.

I claim:
1. A moldable metallic composition consisting essentially of:
   (a) 82 to 98 parts by weight of a metal powder aggregate of iron, copper, aluminum, their alloys, mixtures thereof, or mixtures of a major proportion of one or more of the above metals and a minor proportion of refractory aggregate, said aggregate materials having a particle size of less than 250 microns,
   (b) 2 to 18 parts by weight of a colloidal silica aquasol selected from an alkali stabilized colloidal silica aquasol having a particle size of from 4 to 100 millimicrons, a pH of from 8 to 10.5 and from 10 to 60% $SiO_2$ by weight; a lithium stabilized colloidal silica aquasol having an average particle size of from 1 to 150 millimicrons, a pH of from 10.5 to 12.0, an $SiO_2:Li_2O$ mole ratio of from 4:1 to 25:1 and from 1 to 25% solids by weight;
   and a positively charged metal oxide coated silica aquasol having a particle size of from 4 to 50 millimicrons, a pH of from 3 to 6 and 10 to 50% solids by weight of which 2 to 25% are basic metallic salts, and
   (c) 0.1 to 3.0 parts stabilizer compound per 100 parts colloidal silica aquasol, the stabilizer compound being a soluble salt selected from the group of salts containing chromate, nitrite, phosphate, permanganate, $Mg^{++}$, $Ca^{++}$, $Ni^{++}$, $SO_3^{--}$, $WO_4^{--}$, or $TiO^{--}$ ions.

2. A moldable metallic composition of claim 1 wherein the metal powder aggregate is aluminum or stainless steel.

3. A moldable metallic composition of claim 1 wherein the colloidal silica aquasol is a positively charged alumina coated silica sol.

4. A moldable metallic composition of claim 3 wherein the stabilizer compound is potassium dichromate.

5. A thermally conductive article of the cured composition of claim 1.

6. A moldable metallic composition consisting essentially of
   (a) 82 to 96 parts by weight of a metal powder aggregate of iron, copper, aluminum, their alloys, mixtures thereof, or mixtures of a major proportion of one or more of the above metals and a minor proportion of refractory aggregate, said aggregate materials having a particle size of less than 250 microns,
   (b) 2 to 18 parts by weight of a colloidal silica aquasol selected from an alkali stabilized colloidal silica sol having a particle size of from 4 to 100 millimicrons, a pH of from 8 to 10.5 and from 10 to 60% $SiO_2$ by weight; and a lithium stabilized colloidal silica aquasol having an average particle size of from 1 to 150 millimicrons, a pH of from 10.5 to 12.0, and $SiO_2:Li_2O$ mole ratio of from 4:1 to 25:1 and from 1 to 25% solids by weight; and
   (c) less than 3.0 part stabilizer compound per 100 parts colloidal silica aquasol, said stabilizer being present only where the metal aggregate is incompatible with the colloidal silica aquasols, the stabilizer compound being a soluble salt selected from the group of salts containing chromate, nitrite, phosphate, permanganate, $Mg^{++}$, $Ca^{++}$, $N^{++}$, $SO_3^{--}$, $WO_4^{--}$, or $TiO^{--}$ ions.

7. A moldable metallic composition of claim 6 wherein the metal powder aggregate is aluminum or stainless steel.

8. A thermally conductive article of the cured composition of claim 6.

9. A moldable composition comprising an acid stabilized aluminum oxide coated silica sol containing a stabilizing amount of potassium dichromate.

References Cited
UNITED STATES PATENTS 3,573,071   3/1971   Hortun et al. _____ 106—38.9 X THEODORE MORRIS, Primary Examiner U.S. Cl. X.R.
106—38.9

UNITED STATES PATENT OFFICE
CERTIFICATE OF CORRECTION

Patent No. 3,674,526                    Dated July 4, 1972

Inventor(s) James M. Self

It is certified that error appears in the above-identified patent and that said Letters Patent are hereby corrected as shown below:

Claim 6, line 55, "$N^{++}$" should be -- $Ni^{++}$ --.

Signed and sealed this 13th day of February 1973.

(SEAL)
Attest:

EDWARD M. FLETCHER, JR.          ROBERT GOTTSCHALK
Attesting Officer                Commissioner of Patents